(12) United States Patent
Pearson et al.

(10) Patent No.: US 11,702,150 B2
(45) Date of Patent: Jul. 18, 2023

(54) TANK TRAILER AIRFOIL STRUCTURES AND METHODS

(71) Applicant: Exosent Engineering, LLC, College Station, TX (US)

(72) Inventors: Gerald Pearson, College Station, TX (US); Yuval Doron, College Station, TX (US)

(73) Assignee: Exosent Engineering, LLC, Navasota, TX (US)

( * ) Notice: Subject to any disclaimer, the term of this patent is extended or adjusted under 35 U.S.C. 154(b) by 265 days.

(21) Appl. No.: 17/302,366

(22) Filed: Apr. 30, 2021

(65) Prior Publication Data

US 2021/0300484 A1 Sep. 30, 2021

Related U.S. Application Data

(63) Continuation-in-part of application No. 29/718,772, filed on Dec. 27, 2019.

(60) Provisional application No. 62/704,266, filed on May 1, 2020.

(51) Int. Cl.
*B62D 35/00* (2006.01)
*B60P 3/22* (2006.01)

(52) U.S. Cl.
CPC ............ *B62D 35/001* (2013.01); *B60P 3/224* (2013.01)

(58) Field of Classification Search
CPC ............................... B62D 35/001; B60P 3/224
See application file for complete search history.

(56) References Cited

U.S. PATENT DOCUMENTS

| | | | |
|---|---|---|---|
| D51,414 S | 10/1917 | Guerriero |
| 2,681,192 A | 6/1954 | Pappas |
| 3,999,797 A | 12/1976 | Kirsch et al. |
| 4,441,753 A | 4/1984 | Mason |
| 4,458,936 A | 7/1984 | Mulholland |

(Continued)

FOREIGN PATENT DOCUMENTS

CA 2315339 C 4/2003

OTHER PUBLICATIONS

Aeroserve Technologies Ltd, Airtab Tanker Applications, airtab.com, retrieved from the internet Apr. 13, 2021 <https://www.airtab.com/application-tankers.htm>.

(Continued)

*Primary Examiner* — Lori L Lyjak
(74) *Attorney, Agent, or Firm* — Craige Thompson; Thompson Patent Law; Timothy D. Snowden

(57) ABSTRACT

Apparatus and associated methods relate to an airfoil configured to be disposed at a distal end of a tank. In an illustrative example, the airfoil may be configured such that, when the tank travels at a predetermined minimum speed in a proximal direction substantially parallel to a longitudinal axis of the tank, the airfoil coalesces off-coming air from the tank and distally repositions a low-pressure region downstream of the tank below a plane horizontal to the longitudinal axis. The region may be distally displaced, for example, by at least one of a length scale of the tank. A cross-section of the tank may, for example, define a substantially conic section. A span of the wing may, for example, be orthogonal to the longitudinal axis. The wing may, for example, be below an upper surface of the tank. Various embodiments may advantageously reduce turbulence in the wake of the tank.

20 Claims, 11 Drawing Sheets

(56) References Cited

U.S. PATENT DOCUMENTS

| | | | |
|---|---|---|---|
| 4,789,117 A | 12/1988 | Paterson et al. | |
| 6,183,041 B1 | 2/2001 | Wilson | |
| 7,641,262 B2 | 1/2010 | Nusbaum | |
| 8,025,329 B1 | 9/2011 | Kron | |
| 8,136,868 B2 | 3/2012 | Nusbaum | |
| 8,757,701 B2 | 6/2014 | Guigné et al. | |
| 9,789,916 B1* | 10/2017 | Beelman, III | B60P 3/2225 |
| D920,871 S | 6/2021 | Park | |
| D921,938 S | 6/2021 | Lin | |
| D922,276 S | 6/2021 | Chen | |
| D923,524 S | 6/2021 | Piaskowski et al. | |
| D923,541 S | 6/2021 | Wraith et al. | |
| D924,750 S | 7/2021 | Buller et al. | |
| D927,371 S | 8/2021 | Duncan et al. | |
| D928,047 S | 8/2021 | Buck et al. | |
| D943,477 S | 2/2022 | Chen | |
| D947,749 S | 4/2022 | Ahlstrom | |
| D948,390 S | 4/2022 | Molledo | |
| D949,077 S | 4/2022 | Koo et al. | |
| 2006/0232102 A1 | 10/2006 | Steel | |
| 2009/0236872 A1 | 9/2009 | Wood | |
| 2011/0115254 A1 | 5/2011 | Skopic | |
| 2011/0181072 A1 | 7/2011 | Kempster | |
| 2017/0129549 A1* | 5/2017 | Polgrean | B62D 35/008 |
| 2019/0106162 A1* | 4/2019 | Holden | B62D 35/001 |

OTHER PUBLICATIONS

Jacobs, et al, The Characteristics of 78 Related Airfoil Sections from Tests in the Variable-Density Wind Tunnel 460; National Advisory Committee for Aeronautics, 1933, retrieved from the internet Apr. 21, 2021,<https://ntrs.nasa.gov/archive/nasa/casi.ntrs.nasa.gov/19930091108.pdf>.

Wikipedia, Length Scale, Wikipedia, 2019, retrieved from the internet Apr. 21, 2021 <https://en.wikipedia.org/wiki/Length_scale>.

Mophorn, Mophorn Universal GT Wing Spoiler 110CM Lightweight Aluminum Rear Spoiler Wing Single Deck Hatch Adjustable JG125, Dec. 15, 2016, retrieved from the internet <https://www.amazon.com/Mophorn-Universal-Lightweight-Aluminum-Adjustable/dp/B07SCL6NQC>.

NACA Airfoil, Wikipedia; 2020, retrieved from the internet Apr. 21, 2021 <https://en.wikipedia.org/w/index.php? title=NACA_airfoil&oldid=949083507>.

Schwanen, Markus, Duggleby, Andrew T., Draft: Dynamics and Structures in an Unsteady Pin Fin Convectionsimulation. In Proceedings of ASME Turbo Expo 2009: Power for Land, Sea and Air; 2009, <https://www.exosent.com/papers/Conf3_GT2009-60219.pdf>.

CFD, Turbulence Length Scale, CFD Online, 2012, retrieved from the internet Apr. 21, 2021, <https://www.cfd-online.com/Wiki/Turbulence_length_scale>.

* cited by examiner

TANK TRAILER AIRFOIL STRUCTURES AND METHODS

CROSS-REFERENCE TO RELATED APPLICATIONS

This application is a Continuation-in-Part of and claims the benefit of U.S. application Ser. No. 29/718,772, titled "Tank Trailer Airfoil," filed by Gerald Pearson, et al., on Dec. 27, 2019. This application also claims the benefit of U.S. Application Ser. No. 62/704,266, titled "TANK TRAILER AIRFOIL STRUCTURES AND METHODS," filed by Gerald Pearson, et al., on May 1, 2020.

This application incorporates the entire contents of the foregoing application(s) herein by reference.

TECHNICAL FIELD

Various embodiments relate generally to controlling aerodynamics of a portable tank.

BACKGROUND

Containers have long been used to provide adaptable transport capabilities. Tanks may, for example, be provided on various vehicle types for transport of various types of cargo. Portable tanks may, for example, be adapted for residential, commercial, industrial, or mixed applications. Various tanks may be adapted for use towed and/or carried by dedicated trucks. Such combinations may be known, for example, as tank trailers, tank trucks, and/or tanktainers and associated transport trucks and/or trailers.

Various such tanks may be adapted to transport materials exhibiting fluid behavior. For example, tanks may be adapted to carry large volumes of liquids and/or gases. LPG tank trailers may, for example, be adapted to carry liquids including liquefied gases such as, by way of example and not limitation, liquid ammonia, propane, propylene, dimethyl ether, isobutane, or butadiene.

During transport of a tank, the tank may displace a medium in which it travels (e.g., water, air). The tank may, for example, induce regions of turbulence, eddying, higher and/or lower velocity airstreams (e.g., relative to a speed of travel of the tank), region(s) of higher and/or lower pressure (e.g., relative to atmospheric pressure), or some combination thereof. For example, a medium displaced by a tank during transport may converge again in a wake of the tank.

SUMMARY

Apparatus and associated methods relate to an airfoil configured to be disposed at a distal end of a tank. In an illustrative example, the airfoil may be configured such that, when the tank travels at a predetermined minimum speed in a proximal direction substantially parallel to a longitudinal axis of the tank, the airfoil coalesces off-coming air from the tank and distally repositions a low-pressure region downstream of the tank below a plane horizontal to the longitudinal axis. The region may be distally displaced, for example, by at least one of a length scale of the tank. A cross-section of the tank may, for example, define a substantially conic section. A span of the wing may, for example, be orthogonal to the longitudinal axis. The wing may, for example, be below an upper surface of the tank. Various embodiments may advantageously reduce turbulence in the wake of the tank.

Various embodiments may achieve one or more advantages. For example, some embodiments may advantageously induce more laminar flow downstream of a tank. Various embodiments may, for example, advantageously reduce turbulence and/or eddying downstream of a tank. Various embodiments may, for example, advantageously reduce drag on a tank during travel. Accordingly, various embodiments may advantageously reduce fuel consumption. Various embodiments may advantageously reduce buffeting of vehicles traveling downstream of a tank. Accordingly, various embodiments may advantageously increase safety and/or convenience of vehicles traveling downstream of a tank.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary tank airfoil is introduced on an exemplary tank trailer with reference to FIG. 1A. Second, that introduction leads into a description with reference to FIG. 1B of exemplary wake pressure control. Third, with reference to FIGS. 2A-6 exemplary airfoils are described in application to exemplary portable tanks. Finally, the document discusses further embodiments, exemplary applications and aspects relating to tank airfoils.

Figure 1A:
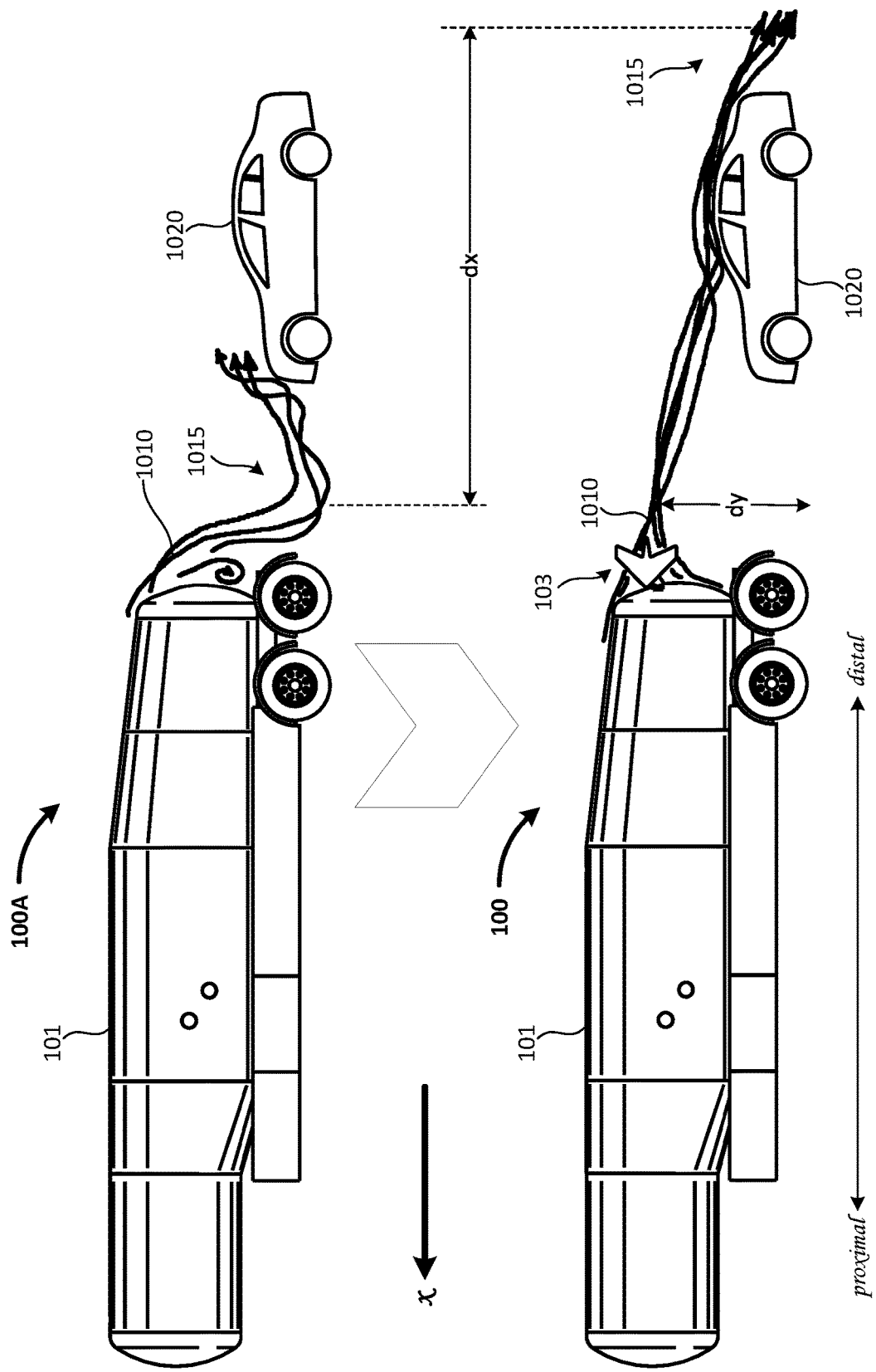
FIG. 1A depicts an exemplary tank airfoil employed in an illustrative use-case scenario.

FIG. 1A depicts an exemplary tank airfoil employed in an illustrative use-case scenario. In the depicted example a tank trailer assembly 100A with no airfoil is traveling in a proximal direction "x" at a speed greater than or equal to a minimum predetermined speed (e.g., at a speed generally corresponding to highway and/or long-distance travel). In various embodiments the minimum predetermined speed may, by way of example and not limitation, be 1 mile per hour (mph), 5 mph, 10 mph, 20 mph, 30 mph, 40 mph, 50 mph, 60 mph, 70 mph, 80 mph, 90 mph, 100 mph, 200 mph, ranges thereof, or some combination thereof. At the rear of a tank 101, off-coming air 1010 causes turbulence 1015 (which may, for example, correspond to a low-pressure region) in the wake of the trailer 100A. The turbulence 1015 causes buffeting of a smaller vehicle 1020 following the trailer. The turbulence 1015 may, for example, induce drag on the tank 101 which may, for example, reduce fuel efficiency of a vehicle (not shown) towing the trailer assembly 100A.

An aerodynamic tank trailer assembly 100 is provided with an airfoil 103 disposed at a distal end of the tank 101. As depicted, the airfoil 103 coalesces streamlines 1010 of off-coming air at the rear of the tank 101 during travel at a speed greater than or equal to the minimum predetermined speed. In the depicted example, the airfoil repositions the turbulence 1015 (e.g., and a corresponding low-pressure region) distally by a distance dx. The airfoil may reposition high-velocity (e.g., maximum velocity) streamlines (e.g., 1010) in the wake of the trailer by, for example, a distance dy. Accordingly, the airfoil 103 may advantageously reduce wind drag. For example, the airfoil 103 may reduce, dissipate, and/or eliminate vorticity in at least some region of the wake of the tank (e.g., within one length scale of a distal end of the tank).

The airfoil 103 may reposition a bulk low-pressure region (e.g., by coalescing off-coming air and reducing and/or repositioning vorticities) further away from the rear of the tank. Accordingly, the airfoil 103 may advantageously reduce wind drag. Reduced wind drag may advantageously increase fuel efficiency. Furthermore, repositioning of turbulence and/or a (bulk) low-pressure region distally and/or upwards may advantageously improve safety and/or convenience of vehicles traveling behind the tank 101 by reducing turbulence near the road surface in the wake of the tank 105 (e.g., close behind the trailer).

In various embodiments, the airfoil 103 may be configured, by way of example and not limitation, to generate low-pressure zones on a top and bottom surface of a (lateral) wing of the airfoil 103. The low-pressure zones may, for example, be symmetric. The airfoil 103 may be configured, by way of example and not limitation, to draw low-pressure from a blunt body of the tank 101, upstream of the airfoil 103 and reposition the low-pressure region distally. The airfoil 103 may be configured, by way of example and not limitation, to coalesce the air flow and direct it downstream of a blunt body of a tank such as tank 101. The airfoil 103 may be configured, by way of example and not limitation, to redirect flow (e.g., a region of impact with the ground of the maximum velocity off-coming airstreams) downstream of the end of the tank by one, two, three, four, or more length scales. Accordingly, the airfoil 103 may advantageously reduce overall drag from the blunt body of the tank 101.

Figure 1B:
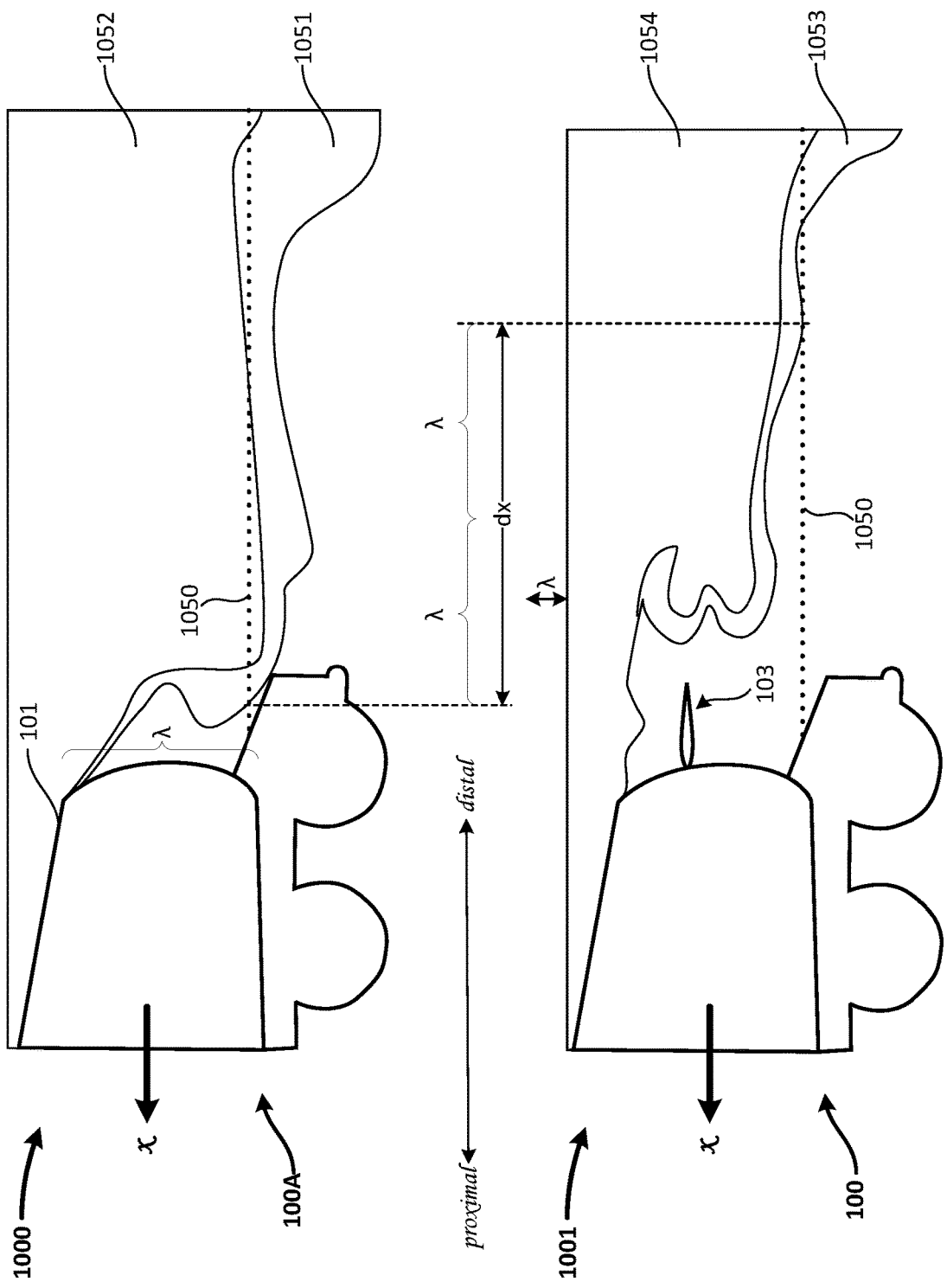
FIG. 1B depicts an exemplary control of a low-pressure region in the rear of a tank by an exemplary tank airfoil.
Figure 2A:
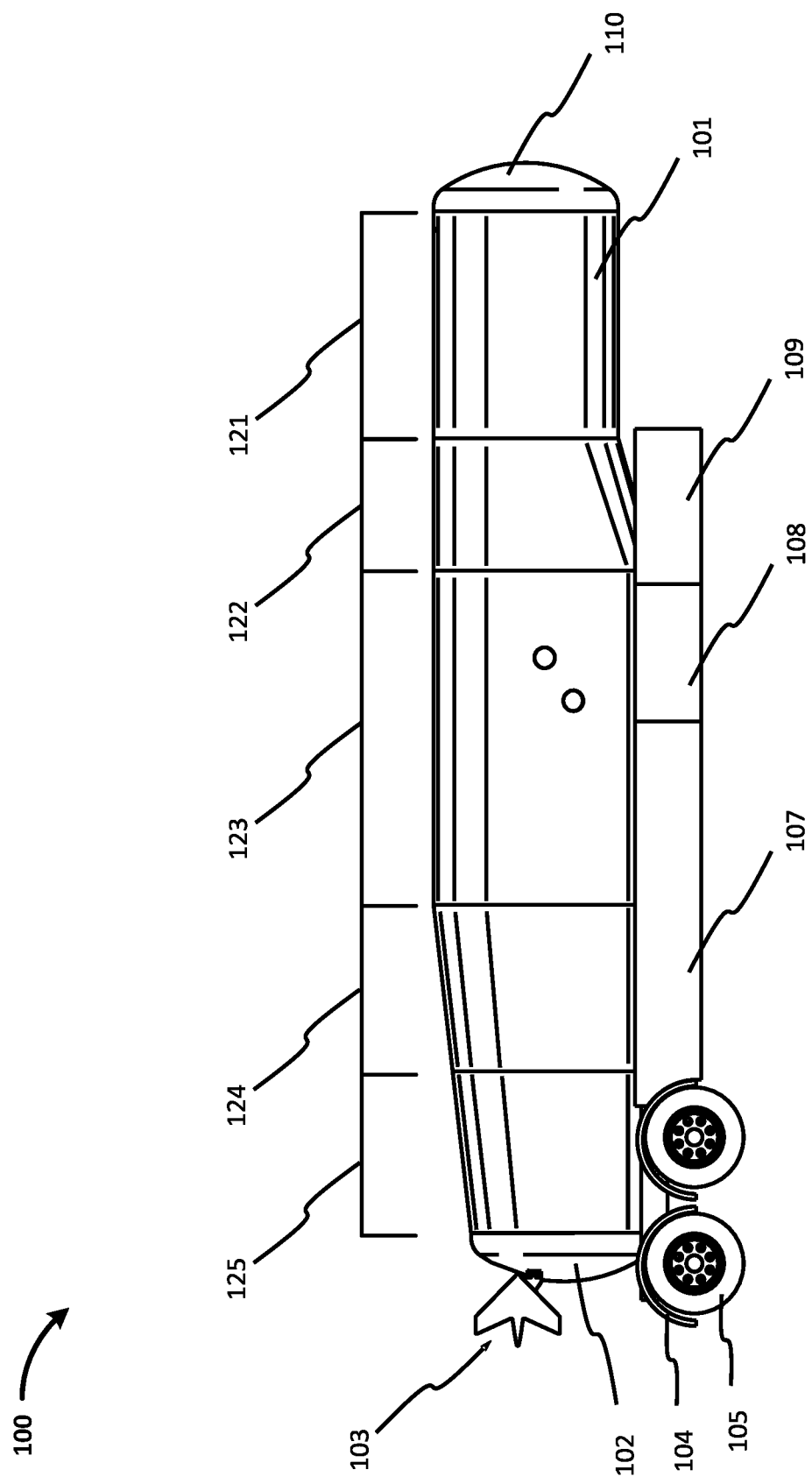
FIG. 2A, FIG. 2B, FIG. 2C, and FIG. 2D depict an exemplary tank trailer with an exemplary tank airfoil.
Figure 2B:
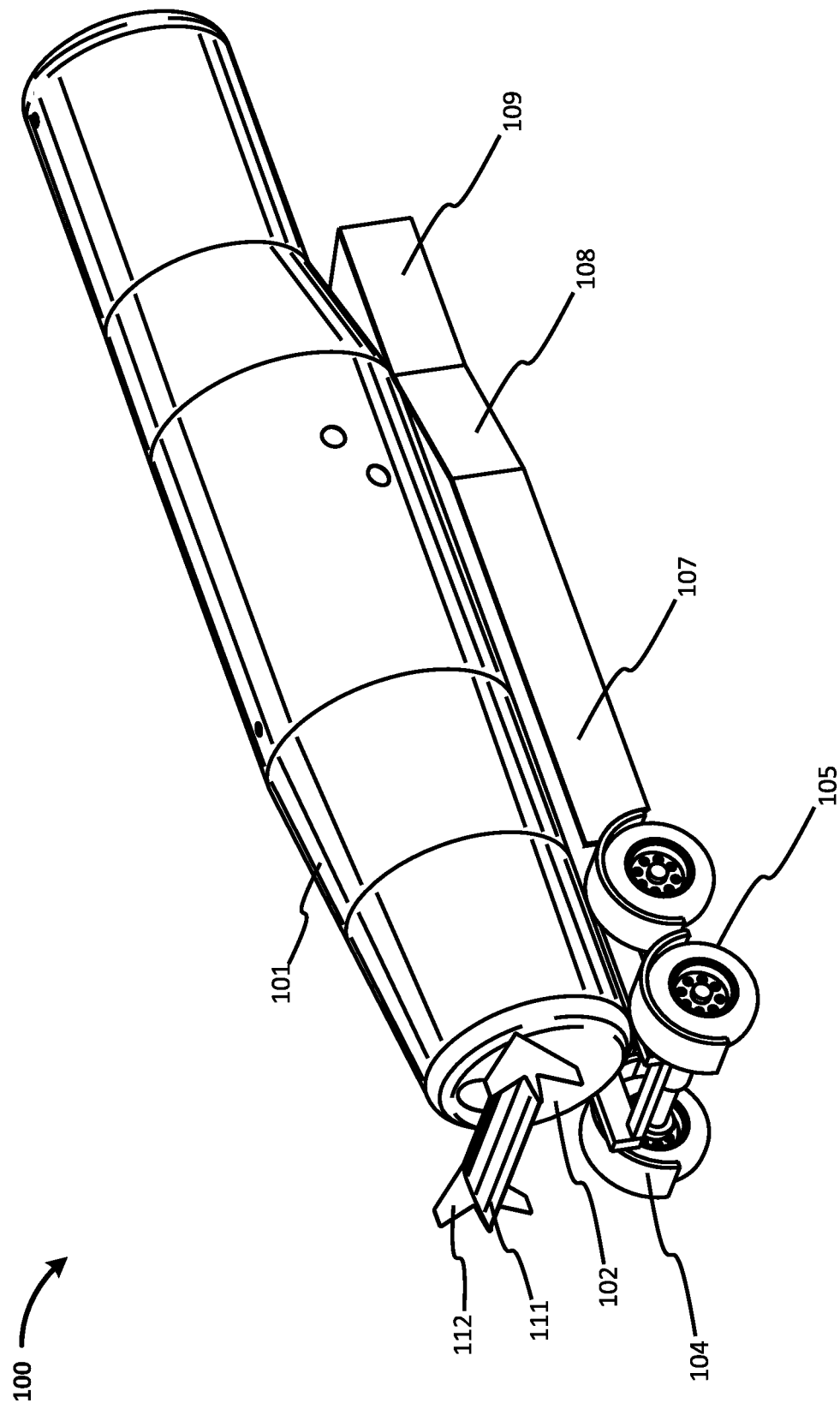
Figure 2C:
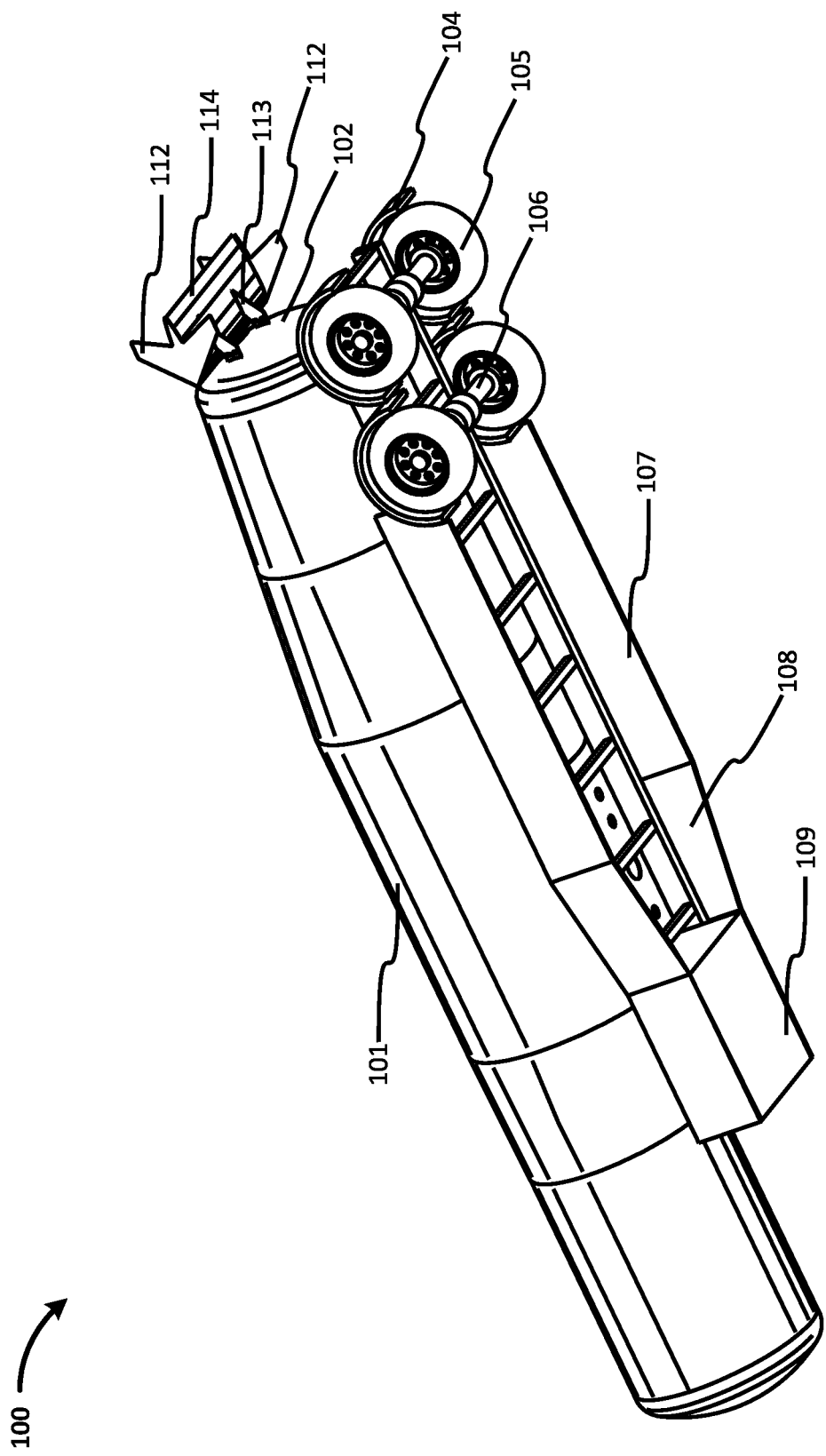
Figure 2D:
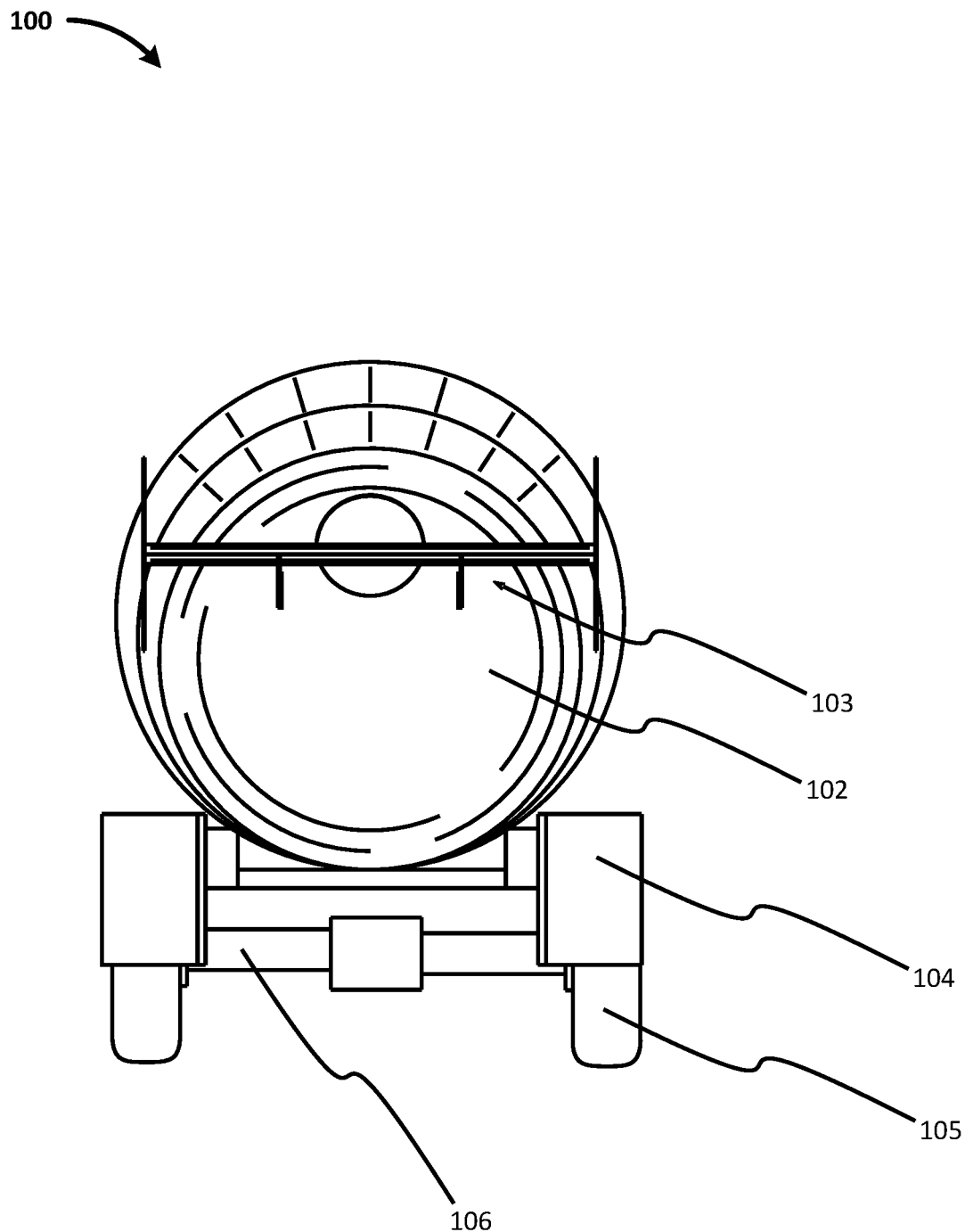

FIG. 1B depicts an exemplary control of a low-pressure region in the rear of a tank by an exemplary tank airfoil. FIG. 1B depicts results of an exemplary computational fluid dynamics (CFD) study comparing a first CFD simulation 1000 of velocity (e.g., corresponding to pressure) streamlines surrounding the tank trailer 100A (without an airfoil) and a second simulation 1001 of velocity streamlines surrounding the aerodynamic tank trailer 100 (with the airfoil 103) traveling in the "x" (proximal) direction at a predetermined minimum speed of 60 miles per hour (mph). The simulations depict velocity of streamlines examined substantially at a lateral midplane of the tank 101.

In the first CFD simulation 1000, as examined below a plane 1050 substantially parallel to the ground and to a longitudinal axis of the tank 101, a high-velocity (e.g., velocity≥35 mph) region 1051 is formed almost immediately behind the tank 101. Within the high velocity/low-pressure region 1051 is a higher velocity region 1052 corresponding approximately to velocity≥40 mph.

In various embodiments high velocity may, for example, correspond to low-pressure. Low-pressure may, for example, include pressure below atmospheric pressure, pressure below at least one predetermined pressure threshold, or some combination thereof. Accordingly, the high-velocity region 1051 may be a low-pressure region 1051.

In the second CFD simulation 1001, as examined below the plane 1050, a high-velocity region 1053 is formed significantly rearward of the tank 101. The high-velocity region 1053 approximately corresponds to velocity≥35 mph. Within the high-velocity region 1053 is a higher velocity region 1052 corresponding approximately to velocity≥40 mph. The region 1053 may be understood as the region 1051 as modified by the airfoil 103. Similarly, the region 1054 may be understood as the region 1052 as modified by the airfoil 103. Accordingly, as depicted, the low-pressure region 1051 below the plane 1050 is repositioned distally rearwards by a distance dx.

In the depicted example, $dx \approx 2\lambda$, where $\lambda$ is a length scale of the tank 101. The length scale $\lambda$ of a blunt body (e.g., tank 101) may be defined as an effective aerodynamic diameter of the body. For example, $\lambda$ may be defined for a tank as the diameter of the tank at which velocity streamlines along the body of the tank 'come off' the distal end of the tank. In the depicted example, $\lambda$ is defined as substantially the diameter of the tank 101.

Simulations 1000 and 1001 are depicted in color CFD vector plots disclosed at least with reference to FIGS. 6A and 6B in U.S. Application Ser. No. 62/704,266, titled "TANK TRAILER AIRFOIL STRUCTURES AND METHODS," filed by Gerald Pearson, et al., on May 1, 2020, the entire contents of which are incorporated herein by reference. As can be seen in the color vector plots, vorticity is reduced in the wake of the tank 101. The wake of the tank 101 may, for example, correspond to one or more regions of recirculating flow immediately behind (e.g., downstream of) the tank 101, caused by the flow of surrounding fluid around the tank 101.

Vorticity may refer, for example, to the (mathematical) curl of a flow's velocity field. Accordingly, vorticity may, for example, be qualitatively determined from velocity streamline plots such as FIGS. 6A and 6B of Provisional Application No. 62/704,266. Vorticity may, for example, describe local "spinning" motion of a continuum near some point. Vorticity may indicate a tendency of a fluid (e.g., air) to rotate in a Lagrangian framework (e.g., observed at a point of interest and traveling with the flow). As depicted in the color CFD vector plots, vorticity is advantageously reduced by the airfoil, as the off coming air is coalesced into more laminar flow.

FIG. 2A, FIG. 2B, FIG. 2C, and FIG. 2D depict an exemplary tank trailer with an exemplary tank airfoil. Tank 101 is, for example, mounted on and/or integral to a trailer including axles 106, wheels and tires 105, and fenders 104. In various embodiments the trailer may be single axle, tandem (two) axle, triple axle, or has four or more axles. In some variations, at least one of the axles may be provided with dual wheels, the trailer may be provided with at least one set of idler wheels, or combinations thereof. In various embodiments, the tank and trailer may be modular. For example, the tank may be mounted and dismounted from the trailer at the point of origin and the point of destination, respectively.

In the depicted example, the tank trailer is provided with a cage enclosure 109 and integrated wind skirt 107. The flared wind skirt portion 108 transitions from the narrower cage enclosure to the full width wind skirt, which runs generally parallel to the tank.

On the rear cap 102 of the tank 101 is mounted the airfoil 103 having end walls 112. A wing of the airfoil 103 has an upper surface 111 and lower surface 114. The airfoil 103 is mounted to the tank 101 via brackets 113. In various embodiments the brackets 113 may be fixed, releasably coupled, and/or integral to the tank 101, airfoil 103, or some combination thereof. In the depicted example the brackets 113 are coupled to the lower surface 114 of the wing and to the rear cap 102. In various embodiments, the brackets 113 may be fixed to the upper surface 111 of the wing. In various embodiments the brackets 113 may be fixed to and/or integral with the end walls 112.

The illustrative tank 101 is a lowered-center-of-gravity tank having a front cap 110 and a cylindrical front segment 121, which generally corresponds to a portion of the tank which rides over a tail of a tractor pulling the trailer. A tapered section 122 is parallel on the top of the tank, but tapered beneath, as the diameter of the tank expands (behind the tail of a tractor pulling the trailer), the larger diameter carrying through in larger diameter cylindrical section 123. The diameter reduces again in restricting section 124, which tapers on the top and bottom of the section. The diameter reduces still further in rear section 125, which is tapered on the top only, tapering to meet the final diameter of the rear cap 102. In various embodiments a length scale of the tank may be defined by a diameter of the rear cap 102 at a proximal end.

The depicted tank 101 may advantageously increase safety (e.g., operators, pedestrians, other traffic, environment) by maximizing the amount of fluid (and, thus, weight) between the wheels. Thus, the center of gravity may be lowered from a traditional, more fully cylindrical, tank trailer, reducing the risk of rollover. The tapered rear portions (124 and 125) force more fluid forwards in the tank, which may thereby prevent overloading the rear axles due to the smaller diameter front portions (121 and 122).

The tapered rear section may be naturally more aerodynamic than a traditional 'bottle' design tank, thereby reducing a drag coefficient ("C drag"), resulting in a lower drag force on the vehicle. The reduced drag force may advantageously cause the tractor engine to use less fuel to move an equivalent load compared to a traditional bottle trailer. Field evidence suggests that tractors pulling this trailer save approximately one (1) mile per gallon when compared to traditional 'bottle' vessels. In various embodiments an airfoil may advantageously be mounted on tanks including, by way of example and not limitation, bottle-type, cylindrical cross-section, elliptical cross-section, tapered, contoured side profile, uniform diameter, or some combination thereof.

Figure 3A:
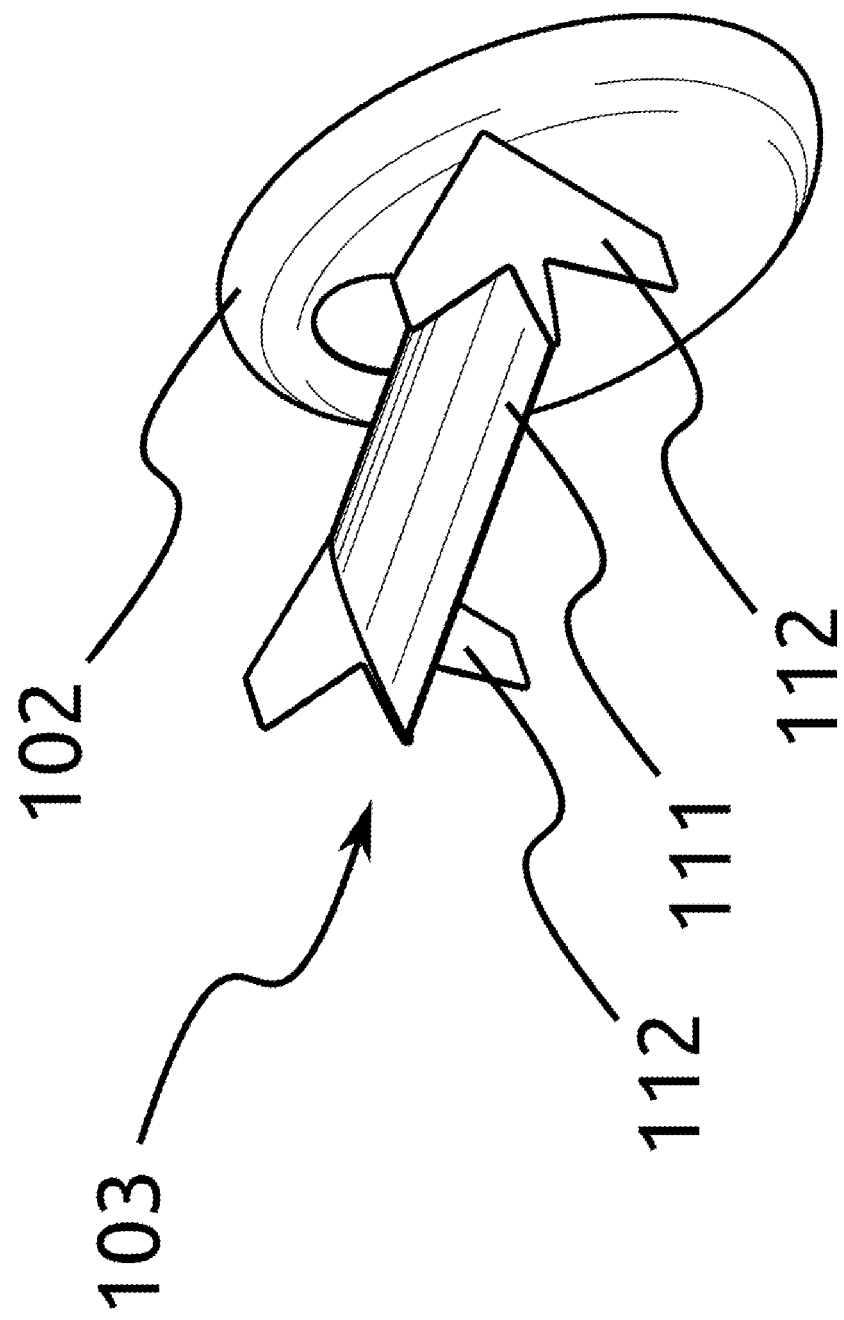
FIG. 3A and FIG. 3B depict an exemplary tank airfoil mounted on an exemplary tank end.
Figure 3B:
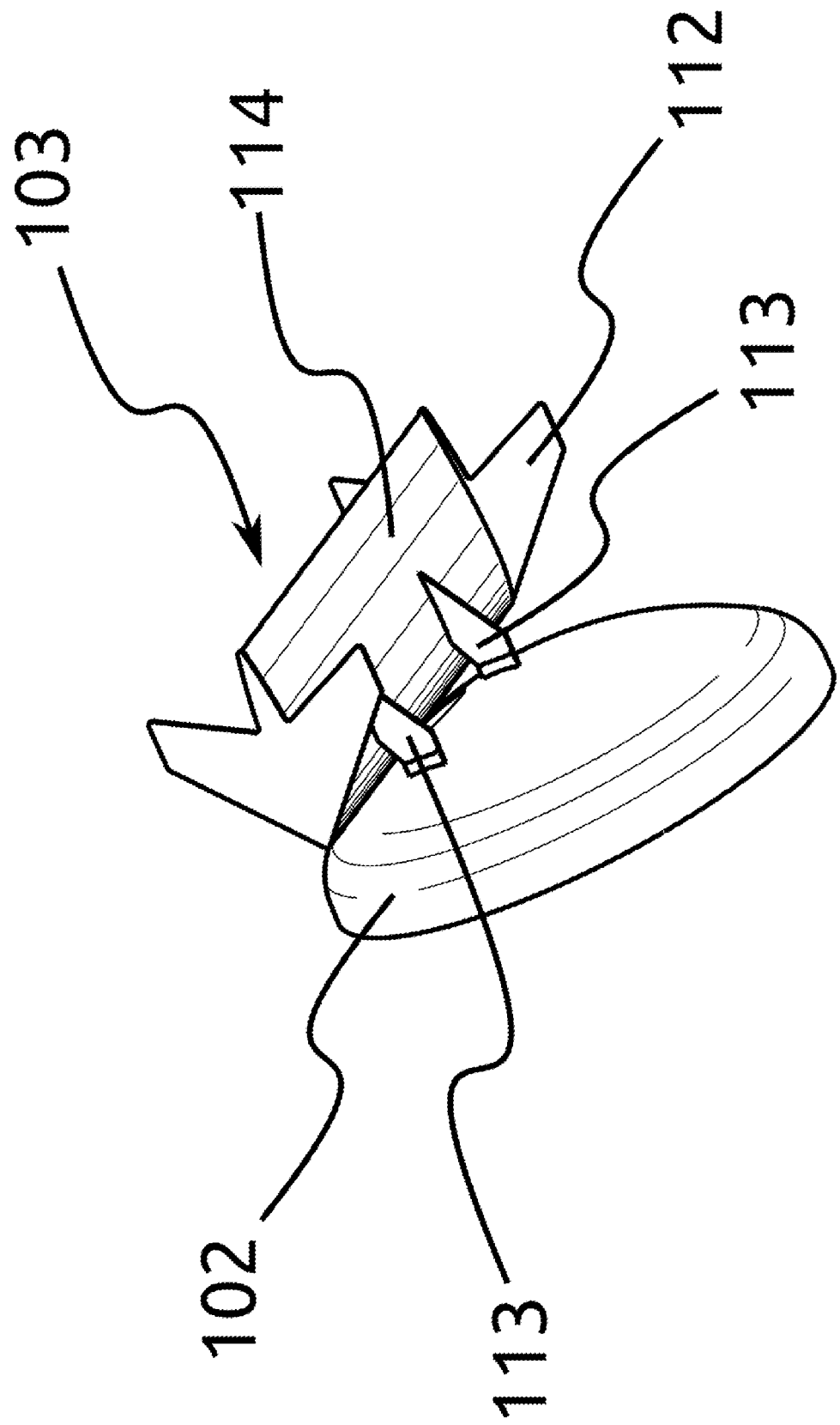

FIG. 3A and FIG. 3B depict an exemplary tank airfoil mounted on an exemplary tank end. The airfoil is identical to that in the embodiment illustrated in FIGS. 1-3. The wing 111 is provided with left and right end walls 112. The airfoil is attached to tank transport 102 via left and right mounting brackets 113, which are attached to end of the tank transport, and to the underside of the airfoil wing 111.

Figure 4:
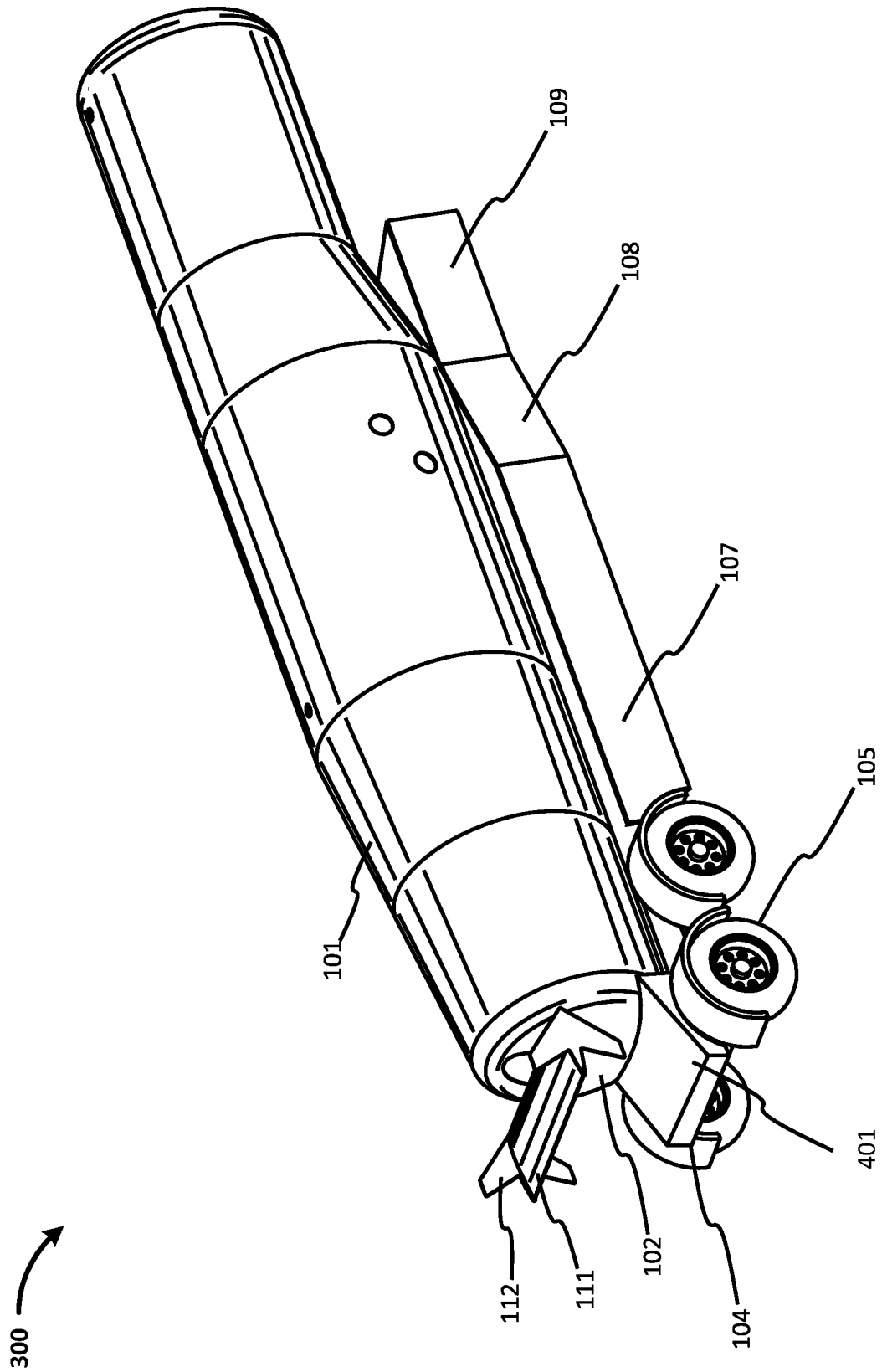
FIG. 4 depicts an exemplary tank trailer with a rear axle cover and an exemplary tank airfoil.

FIG. 4 depicts an exemplary tank trailer with a rear axle cover and an exemplary tank airfoil. As depicted, the tank 101 and airfoil 103 are identical to the embodiment depicted in FIGS. 1-3B. A rear trailer cover 401 is provided in the depicted example. The rear trailer cover 401 may, for example, enhance aerodynamics of the rear of the trailer.

Figure 5:
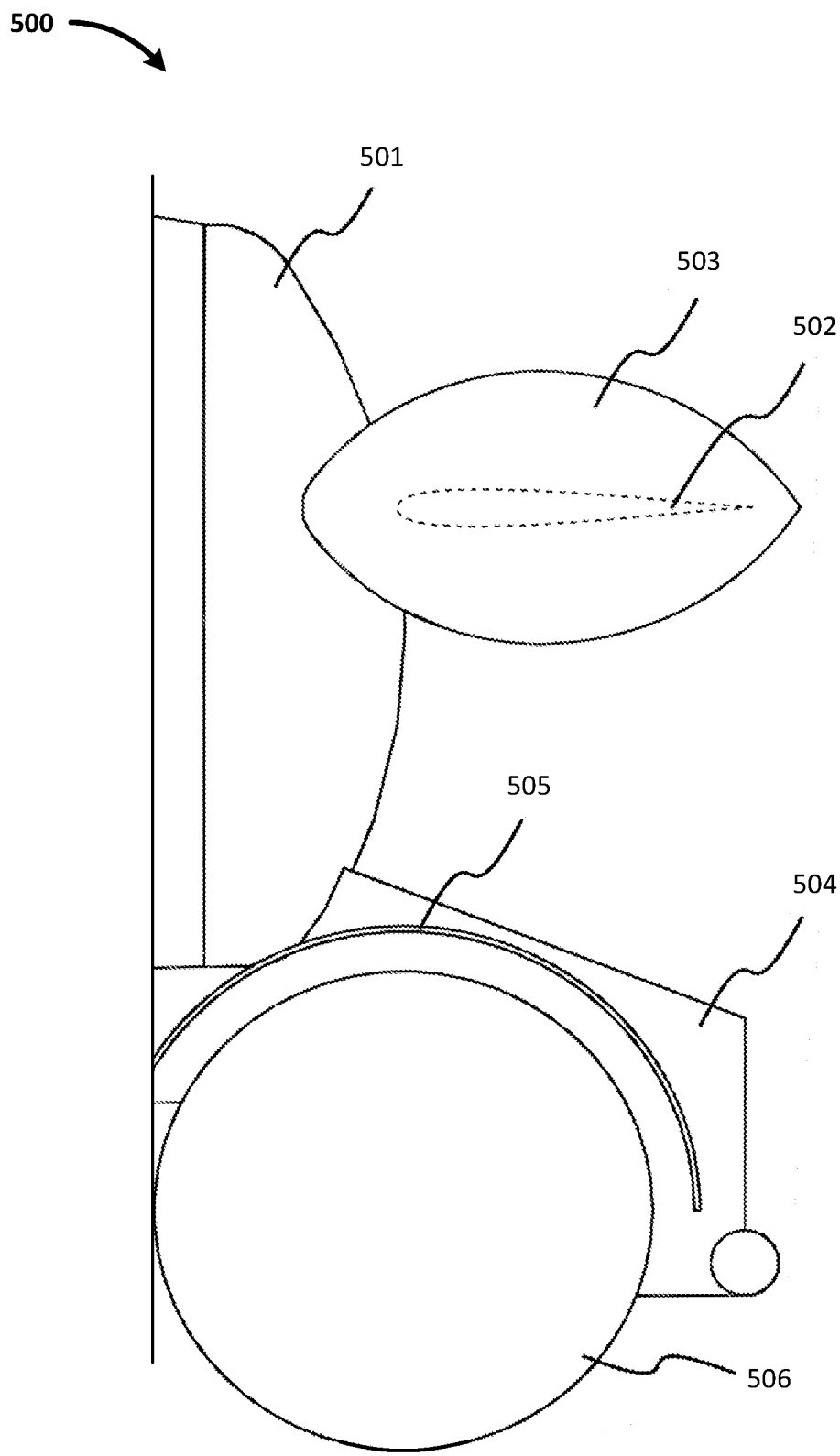
FIG. 5 depicts an exemplary tank airfoil mounted on an exemplary tank.

FIG. 5 depicts an exemplary tank airfoil mounted on an exemplary tank. A tank 501 is provided with an airfoil having a wing 502 (hidden behind left end wall 503) and left and right (not shown) end walls 503. The tank 501 is mounted on a trailer 504 with wheel fender 505 and wheel 506.

The end wall 503 of the present figure illustrates a generally elliptical shape, with a length of the end wall 502 being longer than a chord of the airfoil wing and extending past the end of the wing 502 proximally and distally along the longitudinal axis of the end wall 502. As depicted, the airfoil wing 502 extends rearward from the end of the tank approximately the same distance that the trailer 504 extends past the end of the tank 501. Accordingly, the airfoil may advantageously coalesce streamlines of air coming off of the tank and trailer and reduce eddying currents caused by the protruding trailer, fender, and wheel. The airfoil may, for example, redirect a low-pressure region (e.g., lower than atmospheric pressure) distally by at least one length scale and/or upwards by at least one-half length scale.

Figure 6:
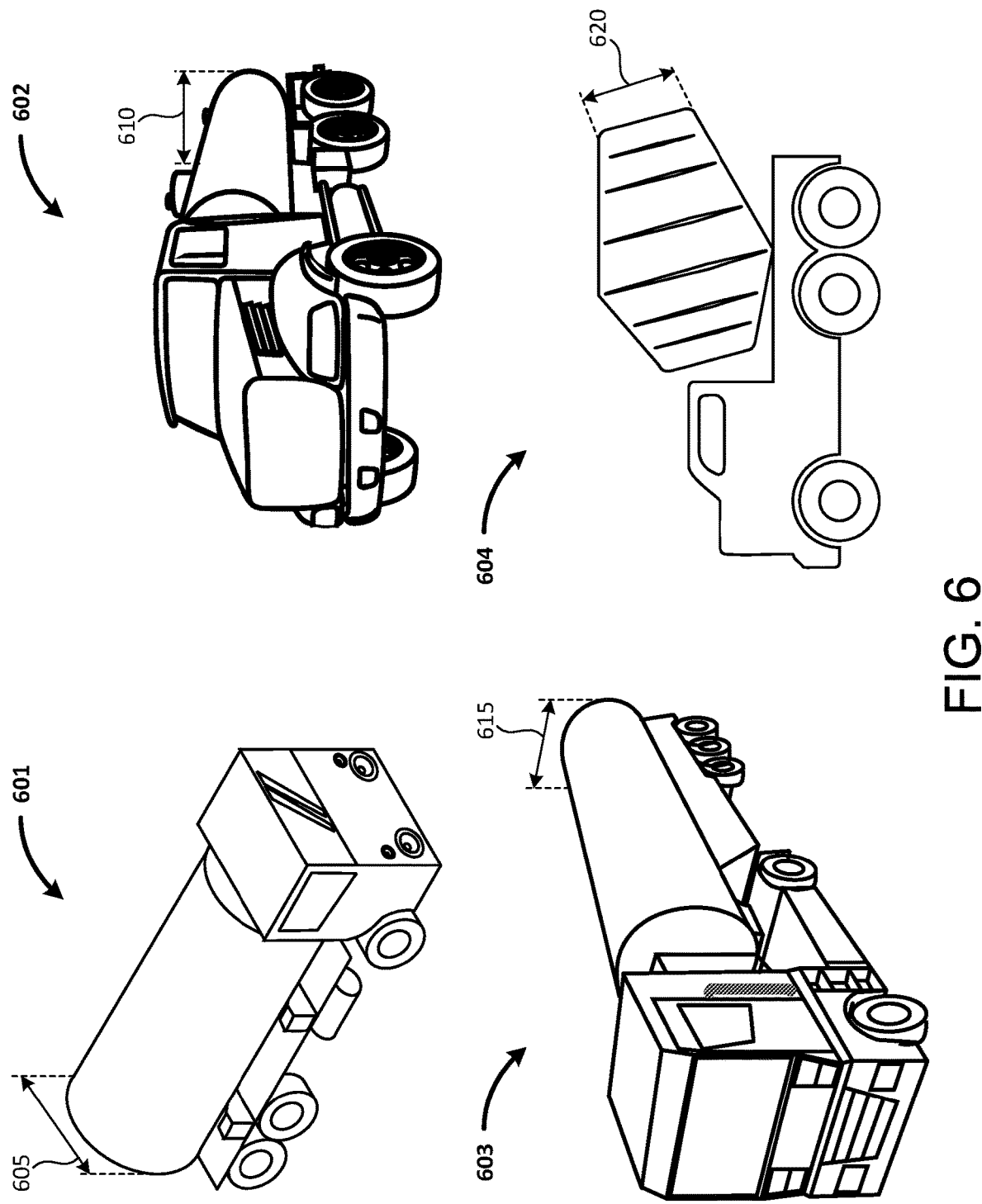
FIG. 6 depicts exemplary length scales of exemplary portable tanks suitable for mounting a tank airfoil.

FIG. 6 depicts exemplary length scales of exemplary portable tanks suitable for mounting a tank airfoil. A first tank 601 is truck mounted. As depicted, the tank 601 is cylindrical, with a substantially constant circular (conic section) cross section relative to a longitudinal axis of the tank 601. A length scale of the tank 601 may be defined, for example, by a diameter 605 of the distal end of the tank 601.

A second tank 602 is truck mounted. The tank 602 is defined by a substantially constant elliptical (conic section) cross section relative to a longitudinal axis of the tank 602. A length scale of the tank 602 may be defined, for example, by a diameter 610 of the distal end of the tank 602.

A third tank 603 is trailer mounted (e.g., configured to be pulled by a separate vehicle, as depicted). The tank 603 is defined by a substantially constant circular (conic section) cross section relative to a longitudinal axis of the tank 603. A length scale of the tank 603 may be defined, for example, by a diameter 615 of the distal end of the tank 603.

A fourth tank 604 is truck mounted. The tank 604 is defined by a varying circular (conic section) cross section relative to a longitudinal axis of the tank 604. A length scale of the tank 604 may be defined, for example, by a diameter 620 of the distal end of the tank 604.

In various embodiments a tank may have a cross section (e.g., relative to a longitudinal axis of the tank) substantially defined by a conic section. In various embodiments, for example, the conic section may be continuous with (substantially) no discontinuities. In various embodiments, for example, the conic section may be approximated and/or modified by one or more linear segments. Such embodiments may, for example, be designed to transport liquids, fluids, gases, solids in a form and scale at which they can be treated as having bulk fluid motion properties relative to a tank of interest, or some combination thereof. Various such embodiments may, for example, be designed to leverage advantages of a substantially conic cross-section including, by way of example and not limitation, funneling of fluid to a bottom region, minimizing wall bending due to weight of contents by minimizing and/or eliminating a linear segment(s) in the cross-section, or some combination thereof.

Although various embodiments have been described with reference to the figures, other embodiments are possible. For example, although an exemplary system has been described with reference to the figures, other implementations may be deployed in other industrial, scientific, medical, commercial, and/or residential applications.

Various embodiments include an airfoil configured to be mounted, integrated into, affixed, and/or otherwise disposed on a rear of a tank to be transported, for example, on a highway. Various embodiments may include a tank with an airfoil thereon, whether fixed removably or permanently thereto, manufactured as integral thereto, or some combination thereof (e.g., integral mounts and removable wing and end walls, permanent wing and removable end walls). Various embodiments may include a tank trailer with an airfoil thereon.

Flow characteristics of a body, such as a tank, may be defined as an attribute of length scale ("$\lambda$"). For example, flow characteristics of a Boeing 747 aircraft are vastly different than those of a Piper Cub, and accordingly a suitable airfoil for one is extremely unsuitable for the other. Likewise, for a small tank (such as one with a forty (40) inch diameter) a large airfoil (such as one suitable for a tank with a ninety (90) inch diameter) may be redundant and, in some circumstances, may be possibly detrimental.

In general, the size of a blunt body (such as a tank) has a length scale that will vary due to its dimensions, such as, for example, predominantly length and diameter. In relation to physics, "length scale" may be defined as "a particular length or distance determined with the precision of one order of magnitude. The concept of length scale is particularly important because physical phenomena of different length scales cannot affect each other and are said to decouple." (Wikipedia, "Length Scale").

More specifically, "The turbulence length scale . . . is a physical quantity describing the size of the large energy-containing eddies in a turbulent flow. The turbulent length scale is often used to estimate the turbulent properties on the inlets of a CFD simulation. Since the turbulent length scale is a quantity which is intuitively easy to relate to the physical size of the problem it is easy to guess a reasonable value of the turbulent length scale. The turbulent length scale should normally not be larger than the dimension of the problem, since that would mean that the turbulent eddies are larger than the problem size . . . . It is common to set the turbulence length scale to a certain percentage of a typical dimension of the problem. For example, at the inlet to a turbine stage a typical turbulence length scale could be say 5% of the channel height. In grid-generated turbulence the turbulence length scale is often set to something close to the size of the grid bars." (CFD Online, "Turbulence length scale").

Turbulence generated from a tank may largely depend on the size of the tank. Thus, as used herein, a "length scale" may generally correspond to a rear diameter of a tank under consideration. As most tanks used for transport are radiused at the end, the rear diameter of a given tank may be the diameter furthest from the end of that tank just before curvature begins. In tanks which are tapered towards the rear end, the diameter may, for example, be at the end of the taper. Specifically, the diameter defining the length scale may be the effective rear diameter of the tank for aerodynamics, being substantially the width of the highest velocity streamlines of air coming immediately off of the rear of the tank before substantial deflection is introduced (e.g., as visually identified in a CFD simulation). In various embodiments the defining diameter may, for example, typically be the same as the rear-most diameter depicted in an orthogonal, two-dimensional rear projection of the tank.

Although various embodiments described herein refer to "diameter," a rear of a tank may be other than a strictly annular structure (defined by a conic section, e.g., generally circular or ellipsoid). For example, in various embodiments, a rear of a tank may be at least one of any closed profile which is substantially flat or concave. The "diameter" (and, accordingly, "length scale") in such embodiments may be governed by the aerodynamics of the tank (and trailer), but may typically be approximately a widest width of the rear of the tank, as that width often governs the width over which the high-velocity streamlines come off of the tank.

In various embodiments, the airfoil wing may be symmetric. The wing may, for example, not be configured to provide appreciable uplift and/or downlift. For example, the airfoil wing may be configured to re-shape the flow behind a blunt body (a tank). The airfoil may redirect the primary low-pressure region at the rear end of the tank downstream at least two (2) length scales, and preferably at least four (4) length scales. The airfoil also reshapes the low-pressure region flowing behind the rear of the tank into a more linear shape.

In various embodiments, an airfoil may be provided with one or more (e.g., two) side plates (end walls). The end walls may, for example, be disposed at respective lateral ends of a wing of the airfoil. The end walls may, for example, reduce vortex generation from the side of the airfoil. In various embodiments, the side walls may be generally vee-shaped, such as disclosed with reference to FIGS. 1 and 2A-4. The point of the vee may, for example, be directed towards the front of the tank, and the open end of the vee may be directed towards the rear of the tank. In some embodiments, the end walls are generally elliptically shaped, such as disclosed at least with reference to FIG. 5, with the long axis of the ellipse aligned substantially parallel to the long axis of the tank. The distal end (towards the rear of the tank) may, for example, be pointed. In various embodiments, other appropriate shapes may be used.

In various embodiments, the end wall may have a height of at least five (5) times the height (e.g., maximum thickness) of the airfoil wing. The end wall may, for example, have a height of at least seven (7) times the height of the airfoil wing. The end wall may, for example, have a length at least as long as a length of the end of the airfoil wing (e.g., a chord of the wing). In various embodiments, the end walls may project forward of the airfoil wing, overlapping the end of the tank. In various embodiments, the end walls may project rearward of the airfoil wing. In various embodiments, the end walls may be the exact length of the end of the airfoil wing.

In various embodiments a "tank" is a vessel intended to contain and transport material, generally fluids. A tank, by way of example and not limitation, may be intended to be carried on a trailer. In various embodiments, a tank may have an annular cross-section (e.g., defined by a conic section), and may be generally cylindrical in shape with spherical ends. In some preferred embodiments, the cylinder shape may vary along the length of the tank. The cylinder shape may, for example, be tapered in some portions of the tank. In various embodiments, the tank may be a tank container ('tanktainer'). In various embodiments, the tank may be intended to carry at least one of: a liquid, a gas, or a powdered or granular material. Table 1 of U.S. Application Ser. No. 62/704,266, titled "TANK TRAILER AIRFOIL STRUCTURES AND METHODS," filed by Gerald Pearson, et al., on May 1, 2020 presents, by way of example and not limitation, a non-exhaustive list of materials which may be advantageously carried in various tanks such as, for example, are disclosed with reference to the figures. In various embodiments: the tank may be other than cylindrical, the tank may have other than an annular or predominantly annular cross-section, the tank may be intended for carrying non-fluid materials, or some combination thereof.

In various embodiments a "trailer" may be a vehicle intended to be pulled behind a vehicle such as, for example, a semi-trailer "tractor," a light-duty truck, and/or other suitable vehicle. For example, trailers may be designed to connect to a vehicle via a king pin hitch, fifth wheel hitch, gooseneck hitch, pintle hitch, bumper ball hitch, other appropriate coupling mechanism, or some combination thereof. In various embodiments a trailer may be integrated into a generally unitary structure with the vehicle, such as in a bobtail-type (in which the axles of the tractor and 'trailer' are all attached to the same chassis) truck (e.g., for propane gas delivery). Various tank trailers advantageously incorporated in various embodiments may include, by way of example and not limitation: pneumatic tank trailers, sewage trucks, sewage trailers, bobtail tank trucks, tanktainers, liquid propane gas trucks, fuel trucks, fuel trailers, silo trucks, silo trailers, cement bulkers, sewage trucks, vacuum trucks, vacuum trailers, or some combination thereof. As used herein, a 'truck' (e.g., a liquid propane gas truck) referred to in the context of being a 'trailer,' may be understood to refer to a truck chassis integrating a trailer (a "tank trailer") and/or provided with a tank receiving system (a "trailer").

A "tank trailer" may, for example, be a trailer with a tank mounted thereon. In various embodiments, the tank may be mounted on the trailer temporarily, the tank may be mounted on the trailer permanently, and/or the tank and trailer may be integrated as a unitary structure. A "tank transport," "transport," and/or "tank transport trailer" may be a tank intended to transport materials. In various embodiments, such terms may refer to at least one of a tank itself or a tank and trailer, whether assembled together temporarily or permanently or integrated.

In various embodiments an airfoil wing (e.g., 103 disclosed at least with reference to FIGS. 2A-2D) may be defined by National Advisory Committee for Aeronautics (NACA) shape code 0012. The first digit (indicating the maximum camber, given as a percentage of the chord) and second digit (indicating the distance of the maximum camber from the airfoil leading edge, given in tenths of the chord) of the shape code, being both zero, indicate that the airfoil has no camber (i.e., it is symmetric). The last two digits of the shape code (indicating the maximum thickness of the airfoil, given as a percentage of the chord) indicate that the maximum thickness of the airfoil is twelve (12) percent of the length of the chord.

In various exemplary embodiments, the airfoil may be a NACA 0012 airfoil. For example, the wing of the airfoil 103 disclosed at least with reference to FIGS. 2A-4, may be a NACA 0012 airfoil. In various embodiments an airfoil (e.g., a NACA 0012 airfoil) may, for example, be designed for tank trailer geometries disclosed, for example, at least with reference to FIGS. 2A-4. For example, a diameter of a rear cap (e.g., 102 disclosed at least with reference to FIG. FIGS. 2A-2D) and, thus, the length scale, may be approximately seventy-eight (78) inches.

In an illustrative example, parameters of an airfoil designed for are given in Table 3 of U.S. Application Ser. No. 62/704,266, titled "TANK TRAILER AIRFOIL STRUCTURES AND METHODS," filed by Gerald Pearson, et al., on May 1, 2020, the entire disclosure of which is incorporated herein by reference. In that example, a span (the width of the wing across the end of the tank) is substantially eighty-four (84) inches. Accordingly, the span of the example airfoil is slightly wider than the diameter of the rear of the exemplary trailer. In various embodiments particular dimensions may be substantially the same, greater, or less than those of the disclosed example.

In various embodiments other NACA shapes may be used (e.g., asymmetric airfoils). For example, various embodiments may be provided with a NACA shape configured to coalesce off-coming air from a tank. The airfoil may be configured (e.g., by selecting a NACA shape) to reposition a low-pressure region, a turbulent region, or some combination thereof, by way of example and not limitation, distally by a first predetermined number of length scale(s) and/or upward by a second predetermined number of length scale(s).

In various embodiments, such as are disclosed at least with reference to FIGS. 1-4B, brackets may be attached to a rear of a tank (such as, by way of example and not limitation, by one or more fastening means selected from a non-exhaustive list of fastening means presented in Table 4 of U.S. Application Ser. No. 62/704,266), and to the underside of the wing of the airfoil (again, such as by fastening means presented in Table 4 of U.S. Application Ser. No. 62/704,2664). In various such embodiments, brackets attached to the rear of the tank may be distinct from those attached to the underside of the wing. The respective brackets may be affixed, and then the airfoil may be mounted to the trailer by fastening the brackets together, such as by fastening means presented in Table 4 of U.S. Application Ser. No. 62/704,266. In various such embodiments, the respective brackets may be removably coupled together, thereby allowing an airfoil to be removed and remounted. Accordingly, an airfoil may advantageously be removed for repair, modification, and/or replacement. Various such embodiments may, for example, provide a predetermined range of adjustment of an angle of the airfoil (e.g., an angle of attack). Accordingly, an angle of attack may be advantageously set to a desired angle (e.g., +/−1 degree, 5 degrees, other appropriate range, or some combination thereof) and secured in place.

In various embodiments, at least one airfoil may be provided for at least one tank, such as an example airfoil disclosed herein with reference to the figures, and such as using a method discussed herein, and then attached to a tank. In some such embodiments, a tank trailer may be chosen to be provided with an airfoil. A method, such as discussed previously, may be used to design an airfoil and/or to select an airfoil from among multiple existing designs. Pre-manufactured and/or custom brackets may be provided for the tank. The brackets may be affixed to the tank, which may, for example, mate with brackets pre-affixed to the airfoil. The airfoil may accordingly be removably or permanently attached to the tank such that airflow off the tank at highway speeds does not remove or significantly (e.g., noticeably and/or within a predetermined angle and/or position) alter the intended position and orientation of the airfoil.

Various embodiments may advantageously provide an airfoil for a portable tank in combination with additional elements of aerodynamic control such as is, by way of example and not limitation, disclosed at least with reference to FIGS. 1-5. For example, a piping cage area may be enclosed (e.g., as depicted in FIG. 2C). A wind skirt may begin at the cage enclosure and flare outwards before running parallel again approximately at the outer edges of the tank, thereby reducing wind drag. CFD studies on such an embodiment indicated a reduction in the drag force on the tank trailer of approximately forty (40) pounds-force. The distance between a left and right windskirt of the windskirt after flaring out (the 'full-width' region) may, for example, be substantially equal to a diameter of the tank in that region.

In various embodiments, a cage enclosure may be open on the bottom, a cage enclosure may be open on the sides, a cage enclosure may be omitted, a windskirt may be of a different height than a cage enclosure, a windskirt height may vary along a length of the tank trailer, a windskirt may be omitted, or some combination thereof. In some variations, a windskirt may be disposed along a substantially straight line tapering wider towards the rear of the trailer.

Results of an exemplary computational fluid dynamics (CFD) study of a tank without an airfoil is depicted in FIG. 5 of U.S. Application Ser. No. 62/704,2664. The colored streamlines indicate velocity ranges, shown in legend 604 of FIG. 6A and FIG. 6B of U.S. Application Ser. No. 62/704,2664. The streamline plots shown in FIG. 5 of U.S. Application Ser. No. 62/704,2664 indicate a large eddy vortex coming off the rear portion of the tank. The vortex shedding on the rear of the vessel indicates a low-pressure region residing at the rear of the vessel which leads to increase drag force.

An exemplary computational fluid dynamics study of an embodiment of a tank transport trailer with and without an exemplary airfoil are depicted in FIGS. 6A and 6B, respectively, of U.S. Application Ser. No. 62/704,2664. The tank trailer assembly comprises a wheel unit 602 protruding to the rear of the tank 601. The figures comprise a vector plot of air streamlines surrounding the trailer when the trailer is traveling at a highway speed of sixty (60) miles per hour (mph). Legend 604 correlates the colors used in the vector plot to calculated velocity of the streamline, with colors mapped to velocities ranging from 0 to 90,000 mph.

FIG. 6A of U.S. Application Ser. No. 62/704,2664 is a vector plot of streamlines surrounding a trailer unit without an airfoil. A region 603, in light blue, depicts a low-pressure region of high velocity streamlines. The main low-pressure region is relatively near to the vessel rear. The low-pressure region is in an 'S' shape, and comes off of the top of the tank, and arches downward until it 'deflects' just above the tip of the protruding wheel unit 602, and then undulates and expands as the distance behind the trailer increases. This higher speed, low-pressure region creates turbulence behind the trailer (in the wake of the trailer), increasing wind drag and buffeting vehicles traveling in the wake of the trailer.

FIG. 6B of U.S. Application Ser. No. 62/704,2664 is a vector plot of streamlines surrounding the trailer unit of the preceding FIG. 6A with a symmetric airfoil 606 added to the rear of the tank. The region 603 is now darker blue, indicating higher pressure, lower velocity streamlines. The lower pressure region of light blue, indicating the higher velocity streamlines, is redirected downstream by the airfoil to redirected region 605.

Qualitative analysis of the results indicate that the airfoil modifies the streamlines coming off the tank trailer and redirects them down stream, from region 603 to redirected region 605. The bulk low-pressure formed behind the tank without an airfoil is removed and is redirected to the airfoil, with a smaller low-pressure region. The low-pressure region is spread out multiple length scales behind the end of the trailer and is at a noticeably higher altitude. The coalesced airflow reduces wind drag. The reduced turbulence and elevated altitude of the higher velocity streamlines increases the safety of vehicles following the tank trailer, especially of smaller, lightweight vehicles.

Various embodiments may provide a method for providing a tank with an airfoil. The method may, for example, include:
(1) evaluating an existing geometry of a tank or tank trailer, such as through a computational fluid dynamics (CFD) study;
(2) identifying at least one low-pressure region near the rear of the tank;
(3) selecting parameters for at least one proposed airfoil design intended to move the low-pressure region(s) at least four (4) length scales downstream;
(4) for each proposed airfoil design, evaluating the geometry of the tank or tank trailer with the proposed airfoil thereon, using the same evaluation(s) as in step (1);
(5) comparing the low-pressure region(s) in the updated evaluation to the evaluations of the other proposed airfoil design(s) (if any), and to the evaluation from step (1);
(6) modifying the parameters of step (3) for the proposed airfoil design(s) based on steps (4) and (5), as necessary or desired; and
(7) repeating steps (4)-(6), as necessary or desired, to at least obtain a degree of coalescing of the streamlines off of the rear of the tank, and to move at least one low-pressure zone near the rear of the tank four (4) length scales downstream.

In an example method of providing an airfoil for a tank, a CFD simulation may be run of a tank without a rear airfoil traveling at a predetermined speed to visualize airflow behavior. In some embodiments, a geometric model of the tank alone may be made and studied using CFD as an initial step. In some embodiments, this step may be omitted, and a geometric model of the tank (e.g., including a truck and/or trailer chassis) may be made. The geometric model may, for example, utilize at least a diameter(s) of the tank. The diameter of the example tank at the rear is seventy-eight (78) inches; thus, the length scale for this example is set at or about seventy-eight (78) inches. The model and a predetermined minimum travel speed (e.g., sixty (60) miles per hour) is used to perform a CFD study, from which is produced a pre-airfoil streamline map, such as is illustrated in FIG. 6A of U.S. Application Ser. No. 62/704,266, pressure map (e.g., as disclosed at least with reference to FIG. 1B). A resultant map (e.g., vector, pressure) is examined to identify at least one turbulence and/or low-pressure zone in the wake (downstream) of the tank.

An airfoil may be configured to redirect the low-pressure zone generally at least 1, 2, 3, 4, or more length scales from the rear of the tank. The geometry of the tank and trailer may be taken into consideration. For example, in FIGS. 6A and 6B of U.S. Application Ser. No. 62/704,266, a trailer 602 protrudes beyond the rear of the tank, affecting the airflow coming off of the tank, and contributing to the vorticities in the streamlines seen behind the trailer in FIG. 6A of U.S. Application Ser. No. 62/704,266, as compared to FIG. 5 of U.S. Application Ser. No. 62/704,266. Accordingly, parameters for at least one airfoil variation may be chosen to coalesce the streamlines coming off the tank and/or redirect the low-pressure zone. Guidelines may, for example, be used to provide initial proposed parameters (or parameter ranges) for key airfoil parameters, in relation to the length scale ($\lambda$). In various embodiments, general guidelines may be determined by the following equations, where "$\approx$" indicates "approximately equal to"):

$$C \approx 0.5\lambda, \text{ where "} C \text{" is the chord length.} \quad \text{Equation 1.}$$

$$0.95\lambda \leq S \leq 1.1\lambda, \text{ where "} S \text{" is span length.} \quad \text{Equation 2.}$$

$$T \approx 0.05\lambda, \text{ where "} T \text{" is the wing thickness.} \quad \text{Equation 3.}$$

$$E_D \geq C, \text{ where "} E_D \text{" is the depth of the endwall measured from front to back, respective to the longitudinal axis of the tank.} \quad \text{Equation 4.}$$

These parameters are 'rule of thumb' guidelines used in preferred embodiments of a method for providing an airfoil on a tank or tank trailer. In various embodiments, final parameters may be chosen outside of initial parameters and parameter ranges given by Equations 1-4. In various embodiments, proposed parameters may be selected outside of the initial parameters and parameter ranges given by Equations 1-4 when dictated by geometries, situations, and factors outside of the scope of this example. In various examples given herein, the decimal places used may only be provided for succinctness of expression and may not indicate significant figures or make any statement regarding precision.

Using these guidelines, where λ is seventy-eight (78) inches, the span of the airfoil may initially be proposed as between seventy-four (74) to eighty-six (86) inches. A value at or greater than λ may initially be chosen to better capture and coalesce off-coming air across the full width of the tank. The chord of the airfoil may, for example, initially be proposed as about thirty-nine (39) inches. The thickness may initially be proposed as four (4) inches. The end wall depth may be at least the length of the chord, or approximately thirty-nine (39) inches or greater.

Because trailer structures other than just the tank affect airflow, additional structures may be taken into consideration as well. In the present example, the length of the chord chosen, together with the positioning of the airfoil along the longitudinal axis of the tank, may, for example, also take into consideration geometry of the trailer extending beyond the rear of the tank. Thus, the chord of the airfoil wing and the positioning of the airfoil place the rear edge of the wing approximately flush with the rear end of the trailer (e.g., as disclosed at least with reference to FIGS. 2A-2D and 4-5).

Once at least one airfoil design has been selected, CFD studies may be performed on each selected airfoil design. An exemplary airfoil design CFD study is illustrated in FIG. 6B of U.S. Application Ser. No. 62/704,266. Each airfoil may create its own low-pressure zones that redirect airflow. Accordingly, airfoil parameters, as well as positioning of the airfoil in relation to the rear of the tank, may be selected to optimize redirection of airflow. Specifically, assuming multiple potential airfoil designs, the updated CFD studies may be evaluated for reduction in low-pressure regions and compared between each other and to the original CFD study without an airfoil.

In an iterative process, better-performing designs may be selected, for example, from the proposed designs. Parameters including, for example, those discussed above and including, for example, positioning of the airfoil on the tank, may be adjusted to qualitatively evaluate resulting effects on airflow off the tank. Incidence angle may be adjusted to qualitatively visualize effects of flow off the tank. In the present example, after performing one or more iterative CFD simulations, a NACA 0012 airfoil (e.g., as disclosed at least with reference to FIGS. 3A-3B) may be chosen, at least partially defined by parameters in Table 2 of U.S. Application Ser. No. 62/704,266. Two field tests indicated that implementation of the air foil defined in Table 2 of U.S. Application Ser. No. 62/704,266, in conjunction with side mounted windskirts, improved fuel economy by substantially fifteen (15) percent over a similar tank trailer without windskirts or airfoil. Field reports also indicated reduced water spray and splash for vehicles behind the trailer, and improved trailer stability due at least in part to reduced turbulence behind the trailer.

A substantially identical process may be followed for a tank without a trailer and may neglect the effects of a trailer on which the tank would travel. Such a process may be advantageous, for example, for tanktainers and for tank trailers in which the geometry of the trailer has minimal effect on the aerodynamics at the end of the trailer.

In various embodiments provisions for attachment of an airfoil to a tank may be made according to methods and structures disclosed herein. For example, the airfoil and brackets for attachment to the tank may be provided in a kit form. In various such embodiments, readily available kits may be provided for predetermined tank configurations, such as for existing tank shapes and sizes. Such kits may, in various embodiments, be provided in pre-determined size increments for various tank purposes, various normal travel speeds, various trailer geometries and configurations, other appropriate parameters, or some combination thereof.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An airfoil comprising a laterally extending wing having a leading edge of greater radius of curvature than a trailing edge, the airfoil being configured to be disposed at a distal end of a tank such that, when the tank travels at a predetermined minimum speed in a proximal direction substantially parallel to a longitudinal axis of the tank, the airfoil coalesces off-coming air from the tank and repositions a low-pressure region downstream of the tank distally by at least one of a length scale of the tank,
wherein:
a cross-section of the tank taken perpendicular to the longitudinal axis defines a substantially conic section,
a span of the wing is substantially orthogonal to the longitudinal axis,
an upper surface of the wing is between the longitudinal axis and a first plane that is parallel to the span and the longitudinal axis and is tangential to an outermost surface of the tank, and,
the low-pressure region is at least partially located between a ground surface and a second plane substantially parallel to the longitudinal axis and between the longitudinal axis and the ground surface.

2. The airfoil of claim 1, further comprising:
a first end wall disposed at a first lateral end of the wing; and,
a second end wall disposed at a second lateral end of the wing.

3. The airfoil of claim 1, wherein an upper surface of the wing and a lower surface of the wing are substantially symmetrical.

4. The airfoil of claim 1, wherein a chord of the wing is substantially parallel to the longitudinal axis.

5. The airfoil of claim 1, wherein the wing is configured to conform to National Advisory Committee for Aeronautics (NACA) shape code 0012.

6. The airfoil of claim 1, wherein a span of a wing of the airfoil is at least ninety-five percent of the length scale of the tank.

7. The airfoil of claim 1, wherein the chord of the wing is between thirty-five and sixty-five percent of the length scale of the tank.

8. The airfoil of claim 1, wherein the length scale is defined by an end diameter of the tank.

9. The airfoil of claim 1, further comprising at least one coupling member secured to the wing and configured to mount the wing to the tank.

10. The airfoil of claim 1, wherein the tank is mounted on at least one of: a trailer chassis and a truck chassis.

11. A tank wake aerodynamic control system comprising:
a tank having a substantially conic cross-section;
an airfoil comprising a laterally extending wing having a leading edge of greater radius of curvature than a trailing edge, the airfoil being configured to be disposed at a distal end of a tank such that, when the tank travels at a predetermined minimum speed in a proximal direction substantially parallel to a longitudinal axis of the tank, the airfoil coalesces off-coming air from the tank,
wherein:
   a span of the wing is substantially orthogonal to the longitudinal axis, and,
   an upper surface of the wing is between the longitudinal axis and a first plane that is parallel to the span and the longitudinal axis and is tangential to an outermost surface of the tank.

12. The system of claim 11, wherein the airfoil further comprises:
a first end wall disposed at a first lateral end of the wing; and,
a second end wall disposed at a second lateral end of the wing.

13. The system of claim 11, wherein an upper surface of the wing and a lower surface of the wing are substantially symmetric.

14. The system of claim 11, wherein a chord of the wing is substantially parallel to the longitudinal axis.

15. The system of claim 11, wherein the wing is configured to conform to National Advisory Committee for Aeronautics (NACA) shape code 0012.

16. The system of claim 11, wherein a span of a wing of the airfoil is at least ninety-five percent of the length scale of the tank.

17. The system of claim 11, wherein the chord of the wing is between thirty-five and sixty-five percent of the length scale of the tank.

18. The system of claim 11, wherein the length scale is defined by an end diameter of the tank.

19. The system of claim 11, further comprising a chassis provided with at least one axle, wherein the tank is mounted to the chassis.

20. The system of claim 11, wherein:
the airfoil is further configured such that, when the tank travels at a predetermined minimum speed in a proximal direction substantially parallel to a longitudinal axis of the tank, the airfoil repositions a low-pressure region downstream of the tank distally by at least one of a length scale of the tank, and,
the low-pressure region is at least partially located between a ground surface and a second plane substantially parallel to the longitudinal axis and between the longitudinal axis and the ground surface.

* * * * *